United States Patent Office 3,759,751
Patented Sept. 18, 1973

3,759,751
CORROSION-RESISTING WASH PRIMER COMPOSITION AND CORROSION-PROTECTED METAL SURFACE
Howard F. Smith, Palos Verdes Peninsula, Calif., assignor to Finch Paint & Chemical Company, Torrance, Calif.
No Drawing. Filed Oct. 30, 1970, Ser. No. 85,789
Int. Cl. C23f 7/26
U.S. Cl. 148—6.2
15 Claims

ABSTRACT OF THE DISCLOSURE

Wash primer comprising an epoxy resin, an inorganic chromate and an amino silane for depositing, particularly on aircraft surfaces, a strongly adherent corrosion inhibiting film which is insoluble in jet fuel and resists aircraft hydraulic fluids, but which is lifted by paint stripping compounds, and metal surfaces protected against corrosion by the combination of a film deposited from the wash primer adhering to the metal surface, an intermediate primer coat adhering to the film from the wash primer, and a highly cross linked solvent insoluble top coat.

FIELD OF THE INVENTION

This invention relates to a corrosion-inhibiting wash primer and to metal surfaces protected against corrosion.

BACKGROUND OF THE INVENTION

Newer coatings for aircraft are more resistant to ultraviolet degradation than those previously used and therefore the interval between painting has tripled over typical intervals previously allowed (over three years to the previous one year). Filiform corrosion has become more obvious, and most airplane owners for ease of inspection insist on ultimate strippability, i.e. down to base metal, for exterior paint systems.

Prior to the present invention this requirement has been met by a polyvinyl butyral resin based "wash primer" in the form of an alcohol solution of the resin pigmented with basic zinc chromate, and an activating solution of phosphoric acid in alcohol as the converter component. This material in thin films enables later coats to be stripped with methylene chloride strippers.

The polyvinyl butyral based wash primers use a chromate pigment that is too insoluble to be an effective corrosion preventative pigment. More soluble chromate pigments used in butyral based wash primers produce films that are too water sensitive to be used as exterior coatings.

It is an object of the present invention to provide an improved corrosion inhibiting wash primer containing partially water soluble chromate corrosion inhibiting pigments and providing improved wetting and adhesion to form a solvent strippable coating with improved corrosion inhibiting action and resistance to jet fuel and aircraft hydraulic fluids particularly fitting it for use in protecting aircraft exterior surfaces.

It is a further object of the invention to provide an ultimately strippable coated metal in which the solvent strippable protective wash primer coat containing soluble chromate corrosion inhibiting pigment combines with an intermediate primer coat and a highly cross linked top coat to provide protection against corrosion and resistance to aircraft hydraulic fluids and jet fuel.

To these ends and in accordance with a feature of the present invention there is provided a wash primer composition based on an epoxy resin selected for its ability to be cured to a state insoluble in aircraft fuel but soluble in or disintegrated by stripping solvents and an amino silane reactive with the epoxy resin to cure it and providing silane groups effective both to aid in wetting the surface to be coated and to increase water resistance of the coating. Soluble chromate inhibiting pigments are incorporated in the wash primer to give superior protection against filiform and other surface corrosion of metal surfaces to which the wash primer is applied.

For the complete protection of metal such as the exterior surfaces of aircraft, the epoxy resin-based wash primer coating on the metal surface is covered with an intermediate primer coat which adheres strongly to the wash primer coating and itself provides a strong base for a highly cross linked top coating such as a known curing type polyurethane aircraft coating.

Epoxy resins useful in the wash primer are those having a

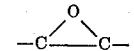

equivalency greater than 1.0 per molecule for reaction with the amino silane to a state insoluble in aircraft fuels. Among such resins are glycidyl polyethers of polyhydric phenols and polyhydric alcohols, glycidyl esters of polycarboxylic acids and the like. The ability to be dissolved in and disintegrated by stripping solvents such as methylene chloride may be secured by using resins having a high equivalent weight. This has the effect of giving a low cross link density which enables stripping solvents to attack the film to give complete strippability. Resins and mixtures of resins giving low cross link density include diglycidyl ethers from reactions of bisphenol A with epichlorohydrin having equivalent weights of at least 400. For example, a commercially available epoxy resin, Epon 1001, having an epoxide equivalent of 450–525 and a molecular weight of 900–1050 has been employed. This resin is the product of combining approximately 4 mols epichlorohydrin with 3 mols of bisphenol A. Resins from reaction of 5 mols of epichlorohydrin with 4 or more mols of bisphenol A, such as Epon 1002, 1004 and 1007 give resins more subject to attack by solvents. The rate of solution or disintegration in stripping solvent is increased by use of epoxy resin or mixtures of epoxy resins with higher epoxide equivalent weights. Resistance to attack by aircraft hydraulic fluids and jet fuel is balanced against ability to dissolve or disintegrate on the action of stripping solvents such as methylene chloride.

A preferred class of epoxy resin useful in the wash primer is epoxy resin modified to include aliphatic chains thus giving "internal solubility." Commercially available resins of this class include an adduct of hydrogenated castor oil and an epoxide (an example of this type of resin is Epotuf 37-151 from Reichhold Chemicals Inc.) and the product of esterifying dimerized soybean oil fatty acid or other dimerized or polycarboxylic acids such as adipic acid with a diglycidyl ether of bisphenol A (Epon 872 from Shell Chemical is an example of this type of resin).

Curing of the epoxide component of the wash primer is effected by an amino silane, preferably one of the class of aminoalkyl alkoxy silanes which provides —Si—O—CH$_3$ and —C—NH$_2$ as functional groups such as N beta-aminoethyl-gamma-amino propyl trimethoxysilane, but other of the known aminoalkyl alkoxy silanes may be used.

Ordinarily it is preferred to use an aminoalkyl alkoxy silane providing sufficient primary or secondary amino groups approximately equivalent to the number of

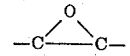

groups in the epoxide resin component of the primer, but it is possible to use an amount of silane less than this to increase strippability. However, to insure best properties, the balance of resistance to aircraft hydraulic fluids and jet fuel against strippability is best served by selection of the appropriate epoxy resin or mixture of epoxy resins.

Corrosion inhibiting chromate pigments useful as part of the wash primer in order of increasing water solubility include lead chromate, barium chromate, basic zinc chromate, strontium chromate, zinc chromate and calcium chromate. Of these lead chromate, barium chromate and basic zinc chromate are not soluble enough to be very effective. Strontium, zinc and calcium chromates are preferred because of their relatively high water solubility which allows better chromate ionization and also because they give more corrosion inhibition per unit weight. These may be used alone or in combination with each other to achieve the proper balance of properties.

The epoxide resin, amino silane and soluble chromate coact in a new and useful way. The amino silane acts to cure the

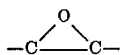

compound and in the curing action it is chemically combined and held in place in the cured coating. In the cured coating the silane residue increases resistance to moisture to reduce penetration of moisture through the wash primer coat to the underlying surface such as metal and this factor is important in enabling the use of the special

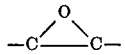

compounds which cure to a state capable of reduction or disintegration by stripping solvents such as methylene chloride. Also the

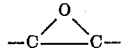

compound and aminosilane coating system is effective to give uniform coverage and superior adhesion to aircraft surfaces and to carry soluble chromate containing pigments so that corrosion agents are counteracted.

The proportions in which the chromate is used in the primer composition may vary from the maximum amount which is that which will remain dispersed uniformly in the vehicle during application down to the minimum amounts effective to give the desired corrosion protection. In practice, the amount used is determined as a compromise between water sensitivity and corrosion inhibition. More strontium chromate can be used than calcium chromate because of the lower water solubility characteristics. These amounts will vary depending on the viscosity of the vehicle and the severity of the corrosion problem. In general, the range may be from about 2% to about 60% of the non-volatile portion of the primer.

The wash primer composition ordinarily will be thinned with solvents to reduce its viscosity to a value suitable for application. Useful solvents are volatile organic liquids miscible with or solvent for the epoxy resin. Such liquids include aromatics such as xylene, toluene, aliphatic ketones including methyl ethyl ketone, methyl n-butyl ketone and methyl isobutyl ketone, alkyl alcohols including ethyl alcohol, isopropyl alcohol and n-butyl alcohol and others. It is desirable to use mixtures including an aromatic, a ketone and an alcohol using from about 10% to about 40% of each. A preferred mixture will contain about equal amounts from each of these categories. There may also be included volatile organic liquids which are compatible with the solvents but not necessarily miscible with the resin components. Such liquids include aliphatic naphthas.

The intermediate primer for application in adhering relation to the coating of wash primer may be any strongly adherent moisture and solvent resistant coating such as the polyurethane base or epoxide resin base polymers used in aircraft coatings. In addition to the epoxide or polyurethane material these compositions will include pigments, fillers and solvents.

The top coat is preferably a highly cross linked polyurethane coating composition of the type now employed for aircraft coatings. In addition to the materials reactive to form the cross linked polyurethane, the top coat will ordinarily contain pigments and solvents.

The procedure for forming the three-coat protective covering involves careful preparation of the surface to be coated to remove corrosion and contaminant such as oil, grease, etc. and application of a thin layer of the wash primer which is ordinarily applied with conventional spray equipment and cured at ambient temperature. A coating thickness of wash primer is applied to insure a continuous film of from about 0.3 to about 0.5 mil thickness when the coating has dried.

At any time after about one-half hour from the time of application of the wash primer coating, the intermediate primer is applied ordinarily by conventional spray procedure. A coating thickness is applied in quantity to provide from about 0.7 to about 1.0 mils dry film thickness. The intermediate primer is ordinarily allowed to dry for from 2 to 4 hours at ambient temperature, scuff sanded, if necessary, and then given the top coating.

The top coating is applied by spray in amount to yield a dry film thickness of from about 1.2 to about 1.4 mils.

The following examples are given to aid in understanding the invention, but it is to be understood that the invention is not restricted to the particular materials, proportions, procedures or conditions set forth in the examples.

EXAMPLE I

The following materials were combined in a ball mill mixer:

Solids

| | |
|---|---|
| Calcium chromate | 3.0 |
| Strontium chromate | 3.0 |
| Talc | 8.0 |
| Epoxy resin | 13.0 |
| Nβ-amino ethyl-α-aminopropyl trimethoxy silane | 1.5 |

Solvents

| | |
|---|---|
| Xylene | 8.0 |
| Toluene | 16.5 |
| MEK | 18.5 |
| MIBK | 8.0 |
| n-Butyl alcohol | 7.5 |
| Isopropyl alcohol | 13.0 |

In the above composition the chromate pigment constitutes 6% of the total formulation or 21% by weight of the solids and the ratio of epoxy resin to chromate is about 2:1.

The epoxy resin employed above was the product of combining 560 grams of glycidyl polyether resin (Epon 836), from reaction of epichlorohydrin with bis phenol A with 174 grams of toluene diisocyanate. As soon as this reaction was complete, 900 grams of castor oil were added for reaction of the OH group with the —NCO groups of the first reaction product. The reactions were carried out in solution in methyl ethyl ketone in amount to give a 50% solution of the product.

The wash primer composition was applied by spraying on a clean aluminum surface to provide a continuous film giving a film thickness after drying of about 0.4 mil.

One-half hour after application of the wash primer, the below-described intermediate primer was applied by spraying in amount to provide a film thickness after drying of about 0.8 mils.

The composition of the intermediate primer was as follows:

Solids

| | |
|---|---|
| Titanium Dioxide | 6 |
| Talc | 14 |
| Hydroxyl containing polyester resin | 13 |
| Polyisocyanate curing resin | 7 |

Solvents

| | |
|---|---|
| n-Butyl acetate | 15 |
| Cellosolve acetate | 15 |
| Xylene | 10 |
| Methyl ethyl ketone | 20 |

About four hours after application of the intermediate primer coat, the coating was given a light scuff sanding and the below-described polyurethane top coating composition was applied by spraying in thickness to yield after drying a layer about 1.3 mils in thickness.

Solids

| | |
|---|---|
| Titanium dioxide | 20 |
| Hydroxyl containing polyester resin | 15 |
| Polyisocyanate curing resin | 10 |

Solvents

| | |
|---|---|
| n-Butyl acetate | 10 |
| Cellosolve acetate | 20 |
| Xylene | 10 |
| Methyl ethyl ketone | 15 |

The resulting coating was strongly adherent and satisfactorily met the requirements as to resistance to the 24-hour water soak test without blistering, the 30-day humidity cabinet test and the 45 day 5% salt spray test.

The coated sample was cleanly stripped of the three layer coating by brush application of a standard stripping compound. The stripping compound basically comprised chlorinated hyrrocarbon solvents including methylene chloride and thixotropic modifiers which hold the applied material on the surface as a thick film. The stripping agent showed effective lifting action of the coating in about 20 minutes at which time the coating was brushed on the surface with a water rinse. The stripped surface was free from coating.

EXAMPLE II

The procedure of Example I was repeated using an aliphatic modified epoxide resin which was an adduct of hydrogenated castor oil and epoxide (Epotuf 37–151) in place of the epoxy resin of Example I.

In this case also the applied coating satisfactorily passed the humidity cabinet, the water soak and the salt tests and was cleanly removed from the metal surface to which it was applied.

EXAMPLE III

The procedure of Example I was repeated; but the intermediate primer composition had the following composition:

Solids

| | |
|---|---|
| Titanium dioxide | 6 |
| Talc | 14 |
| Epoxide resin | 18.6 |
| Diethylene triamine | 1.4 |

Solvents

| | |
|---|---|
| n-Butyl acetate | 15 |
| Cellosolve acetate | 15 |
| Xylene | 10 |
| Methyl ethyl ketone | 20 |

In this case also the applied coating satisfactorily passed the humidity cabinet, water soak and salt spray tests and was cleanly removed from the metal surface to which it was applied.

EXAMPLE IV

The procedure of Example I was repeated using as the epoxy resin a mixture of a glycidyl polyether from reaction of four mols of epichlorohydrin with three mols of bisphenol A (epoxy equivalent of 450 to 525) and a molecular weight of 900 to 1050 and a glycidyl polyether from reaction of 5 mols of epichlorohydrin with about 4 mols of bisphenol A having a molecular weight of about 1400 and an epoxide equivalent of about 870 to 1025, these resins being combined in the ratio of 40 parts by weight of former with 60 parts by weight of the latter.

The coated metal panel successfully passed the tests and the coating was cleanly removed by the stripping procedure.

Having thus described my invention, what I claim as new and desire to secure by Letters Patent of the United States is:

1. A composition for forming a cured, strongly adherent anti-corrosion wash primer coating soluble in aircraft jet fuel but strippable by commercial stripper compounds, said coating comprising at least one polyepoxide from the group consisting of polyepoxides from reaction of (1) —OH groups in a diglycidyl ether from bisphenol-A and epichlorohydrin with a polyisocyanate to form a compound having free —NCO groups and (2) reacting the —NCO groups of this compound with a hydroxyl containing organic compound providing solubility in stripping the solvents, an epoxide adduct of castor oil or chemically modified castor oil and a compound having more than one epoxide group and an epoxide from esterifying dicarboxylic acid with a diglycidyl ether as its primary film forming component, an aminoalkylalkoxysilane in amount to react with said polyepoxide resin to cure it, and a soluble chromate in amount to provide corrosion protection to a metallic surface on which the wash primer coating is applied.

2. A composition as defined in claim 1 containing from about 2% to about 60% by weight based on the weight of the non-volatile portion of the wash primer coating of a soluble chromate from the class consisting of strontium, zinc, calcium and mixtures of these.

3. A composition as defined in claim 2 containing a volatile organic solvent for said resin in amount to reduce the viscosity of the composition for application as a thin coating.

4. A composition as defined in claim 3 in which said polyepoxide includes aliphatic chain groups in the polyepoxide molecule to provide solubility in the stripping compounds.

5. The composition as defined in claim 4 in which said polyepoxide is the product of reacting (1) —OH groups in a diglycidyl ether from bisphenol-A and epichlorohydrin with a polyisocyanate to form a compound having free —NCO groups and (2) reacting the free —NCO groups of this compound with an hydroxyl-containing organic compound providing solubility in stripping solvents.

6. The composition as defined in claim 4 in which said polyepoxide is an aliphatic modified polyepoxide resin.

7. The composition as defined in claim 4 in which said polyepoxide is an adduct of castor oil or chemically modified castor oil and a compound having more than one epoxy group.

8. The composition as defined in claim 4 in which said polyepoxide is the product of esterifying a di- or polyfunctional carboxylic acid with a diglycidyl ether.

9. The combination of a metal surface normally corrodible by contact with moist atmosphere and a composite coating covering said surface, said coating including a wash primer firmly adherent to said metal surface, a more insoluble aircraft primer coating adherent to said wash primer coating and a highly cross linked polyurethane top coating firmly adhering to the primer coating, said wash primer coating comprising the reaction product of a polyepoxide resin from the group consisting of polyepoxides from reaction of (1) —OH groups in a diglycidyl ether from bisphenol-A and epichlorohydrin with a polyisocyanate to form a compound having free —NCO groups and (2) reacting the —NCO groups of this compound with a hydroxyl containing organic compound providing solubility in stripping the solvents, an epoxide adduct of castor oil or chemically modified castor oil and a compound having more than one epoxide group and an epoxide from esterifying dicarboxylic acid with a diglycidyl ether and an amino silane in amount to react with said polyepoxide resin to cure it as its primary film forming component, and a soluble chromate in amount to provide corrosion protection to said metallic surface, said polyepoxide resin reaction product being insoluble in jet fuel but strippable by commercial stripping compounds.

10. The combination of a metal surface and a composite coating as defined in claim 9 in which said soluble chromate is present to the extent of from about 2% to about 60% by weight based on the weight of the nonvolatile portion of said wash primer coating and is selected from the group consisting of strontium, zinc, calcium and mixtures of these.

11. The combination of a metal surface and a composite coating as defined in claim 10 in which said polyepoxide resin includes aliphatic chain groups in the polyepoxide molecule to provide solubility in the stripping solvents.

12. The combination of a metal surface and a composite coating as defined in claim 11 in which said polyepoxide is the product of reacting (1) —OH groups in a diglycidyl ether from bisphenol-A and epichlorohydrin with a polyisocyanate to form a compound having free —NCO groups and (2) reacting the —NCO groups of this compound with a hydroxyl containing organic compound.

13. The combination of a metal surface and a composite coating as defined in claim 11 in which said polyepoxide is an aliphatic modified polyepoxide resin.

14. The combination of a metal surface and a composite coating as defined in claim 11 in which said polyepoxide is an adduct of castor oil or chemically modified castor oil and a compound having more than one epoxy group.

15. The combination of a metal surface and a composite coating as defined in claim 11 in which said polyepoxide is the product of esterifying di- or polyfunctional carboxylic acid with a diglycidyl ether.

References Cited

UNITED STATES PATENTS

| | | | |
|---|---|---|---|
| 3,166,527 | 1/1965 | Ender | 117—132 BSX |
| 3,427,190 | 2/1969 | Murdock | 260—37 EPX |
| 2,847,323 | 8/1958 | Evans et al. | 117—75 |
| 3,220,878 | 11/1965 | Pines | 260—37 EP |
| 3,256,135 | 6/1966 | Weinheimer et al. | 260—37 EPX |
| 3,262,903 | 7/1966 | Robertson | 260—37 EP |
| 3,528,860 | 9/1970 | Kronstein | 148—6.16 X |

OTHER REFERENCES

Negree et al.: Chem. Abstracts, vol. 60, 3194h, 3195 a, b, February 1964.

RALPH S. KENDALL, Primary Examiner

U.S. Cl. X.R.

117—132 BE, 132 BS; 260—37 EP

PO-1050 (5/69)

UNITED STATES PATENT OFFICE
CERTIFICATE OF CORRECTION

Patent No. 3,759,751                    Dated September 18, 1973

Inventor(s) Howard F. Smith

It is certified that error appears in the above-identified patent and that said Letters Patent are hereby corrected as shown below:

In the claims:

Claim 1, line 11, change soluble to --insoluble-- line 20, delete --the--

Claim 9, line 73, delete --the--

Signed and sealed this 15th day of January 1974.

(SEAL)
Attest:

EDWARD M. FLETCHER, JR.         RENE D. TEGTMEYER
Attesting Officer                Acting Commissioner of Patents